(12) United States Patent
Andre et al.

(10) Patent No.: US 9,818,994 B2
(45) Date of Patent: Nov. 14, 2017

(54) HOUSING FOR AN ELECTRICAL MODULE OF A BATTERY PACK FOR A MOTOR VEHICLE, AND ASSOCIATED BATTERY PACK

(71) Applicants: Compagnie Plastic Omnium, Lyons (FR); Valeo Systemes Thermiques, Le Mesnil Saint Denis (FR)

(72) Inventors: Gerald Andre, Amberieu en Bugey (FR); Philippe Gilotte, Benonces (FR); Gilles Elliot, Courcouronnes (FR); Vincent Feuillard, Le Mesnil Saint Denis (FR); Frederic Ladrech, Maurepas (FR)

(73) Assignees: Compagnie Plastic Omnium, Lyons (FR); Valeo Systemes Thermiques, Le Mesnil Saint Denis (FR)

( * ) Notice: Subject to any disclaimer, the term of this patent is extended or adjusted under 35 U.S.C. 154(b) by 324 days.

(21) Appl. No.: 14/375,901

(22) PCT Filed: Feb. 1, 2013

(86) PCT No.: PCT/FR2013/050216
§ 371 (c)(1),
(2) Date: Jul. 31, 2014

(87) PCT Pub. No.: WO2013/114054
PCT Pub. Date: Aug. 8, 2013

(65) Prior Publication Data
US 2015/0249238 A1 Sep. 3, 2015

(30) Foreign Application Priority Data
Feb. 1, 2012 (FR) .................... 12 50960

(51) Int. Cl.
| | |
|---|---|
| *H01M 2/10* | (2006.01) |
| *H01M 10/625* | (2014.01) |
| *H01M 10/6551* | (2014.01) |
| *H01M 10/6554* | (2014.01) |
| *H01M 10/6556* | (2014.01) |
| *B60K 1/04* | (2006.01) |
| *F28F 3/12* | (2006.01) |
| *H01M 10/647* | (2014.01) |
| *H01M 10/617* | (2014.01) |
| *H01M 10/613* | (2014.01) |
| *B60L 11/18* | (2006.01) |
| *B60K 1/00* | (2006.01) |
| *F28F 13/00* | (2006.01) |

(52) U.S. Cl.
CPC ............ *H01M 2/1077* (2013.01); *B60K 1/04* (2013.01); *B60L 11/1879* (2013.01); *F28F 3/12* (2013.01); *H01M 2/1094* (2013.01); *H01M 10/613* (2015.04); *H01M 10/617* (2015.04); *H01M 10/625* (2015.04); *H01M 10/647* (2015.04); *H01M 10/6551* (2015.04); *H01M 10/6554* (2015.04); *H01M 10/6556* (2015.04); *B60K 2001/005* (2013.01); *B60K 2001/0438* (2013.01); *F28F 2013/006* (2013.01); *F28F 2275/08* (2013.01); *H01M 2220/20* (2013.01)

(58) Field of Classification Search
CPC .... H01M 2/02; H01M 2/0245; H01M 2/1077; H01M 2/1094; H01M 2/14; H01M 2/04; H01M 2/0434; H01M 2/0473; H01M 10/613; H01M 10/625; H01M 10/647; H01M 10/6551; H01M 10/6555; H01M 10/6556
See application file for complete search history.

(56) References Cited

U.S. PATENT DOCUMENTS

| | | | |
|---|---|---|---|
| 8,453,773 | B2 | 6/2013 | Hill et al. |
| 8,771,858 | B2 | 7/2014 | Hirsch |
| 2010/0025132 | A1 | 2/2010 | Hill et al. |
| 2011/0206948 | A1 | 8/2011 | Asai et al. |
| 2012/0227931 | A1 | 9/2012 | Heckenberger et al. |
| 2012/0301772 | A1 | 11/2012 | Hirsch |

FOREIGN PATENT DOCUMENTS

| | | |
|---|---|---|
| DE | 102009040814 A1 | 3/2011 |
| DE | 102009058070 A1 | 6/2011 |
| EP | 2337141 A1 | 6/2011 |
| EP | 2362463 A2 | 8/2011 |

*Primary Examiner* — Anca Eoff
(74) *Attorney, Agent, or Firm* — Jacox, Meckstroth & Jenkins (57) ABSTRACT

A housing of a battery pack for a motor vehicle. A module comprising several electric cells is associated with a heat-regulating plate. A wall of the housing comprises an element in relief and exerts a tightening force on the plate. The invention also relates to the battery pack.

21 Claims, 5 Drawing Sheets

HOUSING FOR AN ELECTRICAL MODULE OF A BATTERY PACK FOR A MOTOR VEHICLE, AND ASSOCIATED BATTERY PACK

CROSS-REFERENCE TO RELATED APPLICATIONS

This application is the U.S. National Phase application of PCT/FR2013/050216 filed Feb. 1, 2013, which claims priority to French Application No. 1250960 filed Feb. 1, 2012, which applications are incorporated herein by reference and made a part hereof.

BACKGROUND OF THE INVENTION

1. Field of the Invention

This invention relates to a housing for an electrical module of a battery pack for a motor vehicle and associated battery pack.

2. Description of the Related Art

According to the invention, a "cell" designates a single electrical device capable of producing electric current. A cell can typically produce a voltage of between 2 and 4 volts, generally 3.7 volts, and is generally designed to be associated with other cells, assembled in series, to supply a higher voltage.

A cell may have a rigid or flexible envelope. In the latter case, we speak of a "pouch cell".

A "module" designates a set of several cells having a self-supporting rigid structure, this self-supporting rigid structure consisting either of a single rigid envelope containing several cells with flexible or rigid envelope, or of the assembly of several cells with rigid envelopes, placed beside each other.

Lastly, a "battery pack" designates an electrical assembly containing at least one module and the heat-regulating means for this module, consisting of at least one heat-regulating plate.

The heat-regulating plate is generally cooled, and therefore cooling for the module. It may nevertheless be used, at least temporarily, to heat a module in order to bring it to optimum operating temperature when the climatic conditions are unfavorable. The heat-regulating plate may comprise internal channels circulating a heat transfer fluid.

U.S. Patent Publication No. 2010/0025132A2 describes electric cell modules, equipped with cooling means which may consist of cooling plates maintained at a temperature of below 43° C., heat sinks or systems circulating cold air from the vehicle main cooling circuit.

In this type of assembly, the quality of the contacts between the modules and the cooling plates must be excellent. However, this result is difficult to achieve since it implies that the dimensions of the cells and the cooling means must be highly accurate, which is generally not the case. In addition, dimensional variations of these constituents may appear or increase during the life of the battery pack. Consequently, a simple stack, as proposed in the state of the art, does not provide the conditions required for optimum heat conduction between the modules and the cooling means.

Faced with a problem of heat conduction between two surfaces, it is also known to insert a heat-conducting interface between these surfaces, such as a heat-conducting film, sometimes called a "thermal pad". An example of such a thermal pad is a silicone film having a ceramic load, which improves the heat conduction between each cell and the cold plate by compensating for small flatness or alignment defects of the lower wall of each cell of the module and flatness defects of the cooling plate. However, these compensations are approximately one tenth of a millimeter, which is not sufficient to compensate for contact defects in all cell assembly configurations. In addition, these compensations using a heat-conducting film still depend on whether or not the cooling plate is properly tightened against the cells.

There is therefore a need for an efficient solution to tighten the cooling plate against the module whose temperature it is supposed to regulate.

SUMMARY OF THE INVENTION

This invention aims to propose a novel, simple and inexpensive solution, to guarantee excellent thermal contact between a module and a heat-regulating plate. This solution may advantageously be combined with that, already known, of adding a heat-conducting film.

This invention relates to a housing of a battery pack for a motor vehicle comprising an inner space designed to contain at least one module, comprising a set of several electric cells, associated with a heat-regulating plate, the housing having at least one wall designed to rest against the heat-regulating plate of a module when this module is present in the inner space of the housing, this housing being characterized in that it comprises means for tightening a module against the wall and in that the wall comprises, on its side facing towards the heat-regulating plate, an element in relief contained within a volume having a convexity turned towards the inner space of the housing.

According to the invention, the wall designates the inner side of a partition. This partition may be the bottom of the housing, in which case the outer side of the partition is the outer side of the bottom of the housing, or an inner partition of the housing, separating for example two compartments thereof, in which case the outer side of the partition is still located inside the housing but not in the inner space containing the module.

Advantageously, the wall is made from a thermoplastic material (e.g. polypropylene), a thermosetting plastic material (e.g. polyester), a mixture of the two previous materials, this material being optionally loaded with glass or carbon fibers, polyethylene or any other load, molded aluminum (e.g. compression molded), cast aluminum.

According to the invention, the fact that the element in relief lies within a convex volume reflects the fact that it is arranged and dimensioned to transmit to the heat-regulating plate a tightening pressure exerted by the wall, this tightening pressure being such that the element in relief and the wall remain against each other, notwithstanding a possible deformation of the wall caused by the tightening.

"Deformation caused by the tightening" designates any variation in shape of the wall between the state in which it exerts no pressure on the plate and the state in which it exerts the tightening pressure on the plate. This expression therefore excludes any geometrical defects intrinsic to the wall and obtained independently of the tightening, for example due to a molding defect. The deformation considered may be plastic or elastic.

The convexity of the element in relief is designed to compensate for the deformations of the wall, generated by the tightening and which are more pronounced in its center than near its edges. Those skilled in the art will know, by calculations and/or successive tests, how to determine the height and convexity required to compensate exactly for the deformation of the wall, considering in particular its dimensions, material, thickness and the tightening forces.

The tightening means may comprise means for closing the housing, comprising a bottom and a lid, the bottom or the lid comprising the wall intended to rest against the heat-regulating plate.

The tightening means may also comprise means for attaching the module directly to the wall, for example using flanks tightened to two opposite sides of the module, even if the housing has not yet been closed.

In both cases, the tightening means define a tightening direction S which may, for example, be perpendicular to the wall.

In a special embodiment, wherein the tightening means define a tightening direction, the convexity of the element in relief is defined by the following characteristics, the heights being measured in the tightening direction:

existence of at least one highest (absolute) point H of the element in relief, existence of at least one plane P of projection passing through the highest (absolute) point and parallel to the tightening direction S, this plane being such that in any area (obtained by projection on the element in relief of a disc of predetermined diameter located in a second plane P' perpendicular to the tightening direction S and passing through the highest point) of the element in relief, there is at least one highest (relative) point $H_i$ whose orthogonal projection $h_i$ on the plane of projection has a height on the plane P of projection which decreases with the distance between the projection and the highest (absolute) point H.

In the above definition, "point" designates a very small area of the element in relief similar to a mathematical point for the requirements of the projection operation, this mathematical point being substantially in the center of the area.

The highest points of the element in relief therefore form a layer of contact areas with the heat-regulating plate which follows a domed shape and ensures efficient tightening of the heat-regulating plate, even if the wall deforms during tightening, either immediately or over time.

The contact areas may form a continuous area or be disjointed, being for example a set of "linear" (i.e. reduced to areas of small width and long length), or "point" (i.e. reduced to small areas) contact areas.

In a first embodiment of the invention, the element in relief comprises a solid having a convexity turned towards the inside of the housing.

According to a first variant, the solid comprises a network of ribs projecting from the inner side of the wall and lying within an envelope domed towards the inside of the housing, for example a spherical cap, with a top substantially in the center of the wall.

Advantageously, the ribs of the network of ribs are integrally molded with the wall.

These ribs comprise a free upper edge opposite their base.

This free upper edge may be convex, in which case the contact between each rib and the heat-regulating plate occurs along the free edge, which defines a linear contact area (i.e. a long narrow area).

The free upper edge may also be undulating or castellated, in which case the contact between each rib and the heat-regulating plate occurs at the tops of this free edge, which define point contact areas, formed by the tops.

According to a second variant of the embodiment, the solid is obtained by giving the wall a convex shape towards the inside of the housing, either due to the fact that the wall thickness is relatively constant and concave to the outside of the housing, or due to the fact that the wall is thicker, for example being thin close to its edges and thickening towards the center, with its outer side being substantially flat. Ribs may also be provided on the outer side of the wall to strengthen it.

According to a third variant, the solid comprises a set of studs formed on the bottom wall and each contact area is the top of a stud.

To check the convexity of the element in relief in the meaning defined previously, i.e.:

existence of at least one highest (absolute) point, existence of at least one plane of projection passing through the highest point and parallel to the tightening direction, a method may comprise:

1) Defining a diameter D according to the dimensions of the plates and the module. D will be between 20 and 80 mm, preferably between 30 and 60 mm.
2) Detecting the highest (absolute) point H of the element in relief.
3) Creating, in the plane passing through H and perpendicular to the tightening direction S, a grid of square mesh of side $D/\sqrt{2}$ (where $\sqrt{2}$ is the square root of 2) and drawing discs on the convex surface of the solid.
4) Detecting, inside each area projected (which is almost a disc, ignoring the plate convexity), the highest point $H_i$ (relative to this area) of the element in relief.
5) Taking a plane P passing through H and parallel to the tightening direction and to a first large dimension of the wall.
6) Projecting orthogonally on the plane P the highest points $H_i$ obtained in step 3 which are located at a distance from the plane P of less than the diameter D, to obtain points $h_i$.
7) Checking that, on the plane P, the broken line passing through all the points $h_i$ and through point H is convex.
8) Rotating the plane P around the tightening direction at regular angular intervals, until the entire area of the wall has been swept, and repeating steps 5 to 6 at each interval.

In a second embodiment of the invention, compatible with the previous, the element in relief comprises a block of deformable material having an outer side of convex shape towards the inside of the housing.

This deformable material may be a foam.

The block of deformable material may have the shapes described previously, to produce contact areas forming a continuous area or that are disjointed, being for example a set of linear or point contact areas.

The previous embodiments may be combined. The scope of the invention includes, for example, a housing having a thicker bottom wall and completed by a solid having a convexity towards the inside of the housing.

Advantageously, the wall has a first large dimension L along a first direction, a second large dimension I along a second direction perpendicular to the first. When the element in relief has a convexity turned towards the inside, as in the case of a network of ribs or a wall or a block of foam of convex shape, the maximum height of the convexity, i.e. the height variation between the highest point and the lowest point of the element in relief, is preferably less than 2% of one of its two larger dimensions L and I of the wall (i.e. excluding its thickness), preferably of the smaller dimension. An interval of 0.1% to 2% is preferred. An interval of 0.2% to 0.5% is even more preferred. For a square wall of side 500 mm, the maximum height of the convexity of the element in relief may be 2 mm. In absolute values, the maximum height of the convexity should nevertheless preferably not exceed 5 mm, irrespective of the dimensions L and I.

The invention also relates to a battery pack for a motor vehicle, wherein it comprises a housing containing at least one module associated with a heat-regulating plate, the housing having at least one wall designed to rest against the heat-regulating plate of the module, this wall having on its inner side turned towards the heat-regulating plate an element in relief arranged and dimensioned to transmit to the heat-regulating plate a tightening pressure exerted by the wall, this tightening pressure being such that the element in relief and the wall remain in contact with each other, notwithstanding a possible deformation of the wall caused by the tightening, this contact occurring at least at points of the element in relief, distributed such that any disc of 20 to 80 mm diameter, preferably 30 to 60 mm diameter, drawn (by projection) on the heat-regulating plate contains at least two of these points.

Ina special embodiment, each cell comprises a rigid envelope and the envelopes of the cells in a given module form a rigid block by being pressed against each other along a transverse direction (with respect to the cell—plate—element in relief stacking direction), with their bottoms coplanar.

Preferably, the rigid envelopes of the cells have a prismatic shape, with rectangular bases. Other shapes are nevertheless possible.

In a special embodiment, several modules share the same heat-regulating plate. In another embodiment, each module has its own heat-regulating plate.

According to the invention, good heat conduction is obtained in the short term, conduction occurring between the module and the heat-regulating plate as soon as the plate is tightened in the housing, and/or in the long term, conduction between the module and the heat-regulating plate being maintained over time to a greater extent than if the heat-regulating plate had not been tightened in the housing. In other words, the quality of the contact between the heat-regulating plate and the module is such that the performance of the heat exchanges between module and heat-regulating plate is maintained during the lifetime of the vehicle without the effects of ageing, especially temperature variations, vibrations, creep of materials, being felt.

We can see the advantage of the element in relief according to the invention to compensate for any tightening defect of the plate against the module. Whether tightening is obtained by closing the housing or by attaching the module to the wall using flanks, there is a risk that the module dimensions are such that the tightening points, i.e. the side walls of the housing or the points of attachment of the flanks, are too far apart from each other, allowing the plate to curve and no longer be tightly pressed against the module in regions far away from the tightening points. This is the case in particular if several cells are assembled together to form a larger module.

With the element in relief according to the invention, the heat-regulating plate is sandwiched between this element in relief and the bottom wall of the module (with optional insertion of a thermal pad), evenly over the entire bottom of the module.

An alternative to the presence of the element in relief could comprise fastening the heat-regulating plate to the bottom of each electric cell forming the module, but this measure would require the presence of means for attaching the plate to the bottom of each cell, as well as the supply and installation of attachment members on the battery pack assembly line, generating a non-negligible increase in material and energy costs. The invention avoids these disadvantages.

Another advantage resulting from the fact that there is no need to attach each cell to the plate is that a defective module can easily be replaced, without having to dismantle the plate or drain the circuit of heat transfer fluid circulating in the plate.

In a special embodiment of the invention, the element in relief comprises a pouch of incompressible liquid. As a variant, this liquid is a gel.

The liquid offers the advantage of transmitting uniformly and isotropically the pressure placed on it and which results from the force tightening the wall against the plate. It therefore advantageously replaces any other mechanical means designed to uniformly distribute the housing tightening force over the heat-regulating plate.

In addition, the liquid or gel may exhibit suitable heat insulation properties, as well as electrical insulation properties.

BRIEF DESCRIPTION OF THE ACCOMPANYING DRAWINGS

The invention will be easier to understand on reading the following description of embodiments given as non-limiting examples, and referring to the attached schematic drawing in which.

DETAILED DESCRIPTION OF THE PREFERRED EMBODIMENTS

Figure 1:
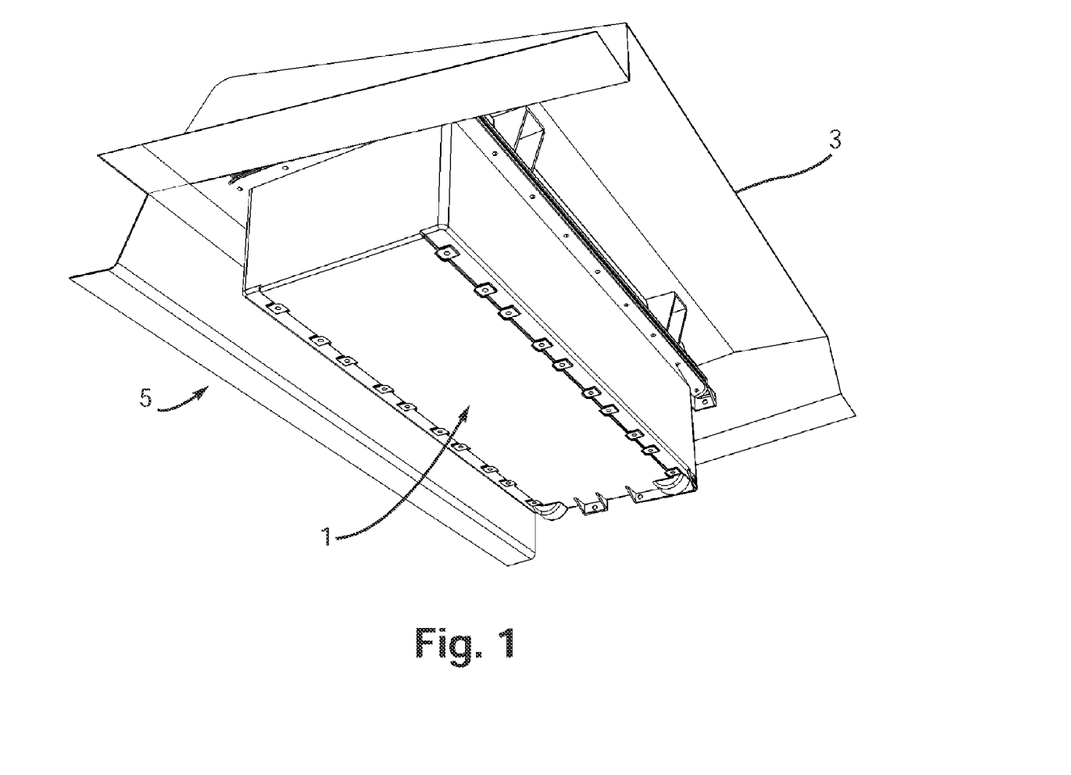
FIG. 1 is a perspective view from underneath of a battery pack according to an embodiment of the invention, in its closed housing and fitted under a vehicle.

FIG. 1 shows a battery pack 1, fastened under a floor 3 of a motor vehicle, inside a compartment 5 provided for this purpose.

The floor 3 may be made from polypropylene.

This arrangement of the battery pack 1 under a floor 3 is only a non-limiting example.

Figure 2:
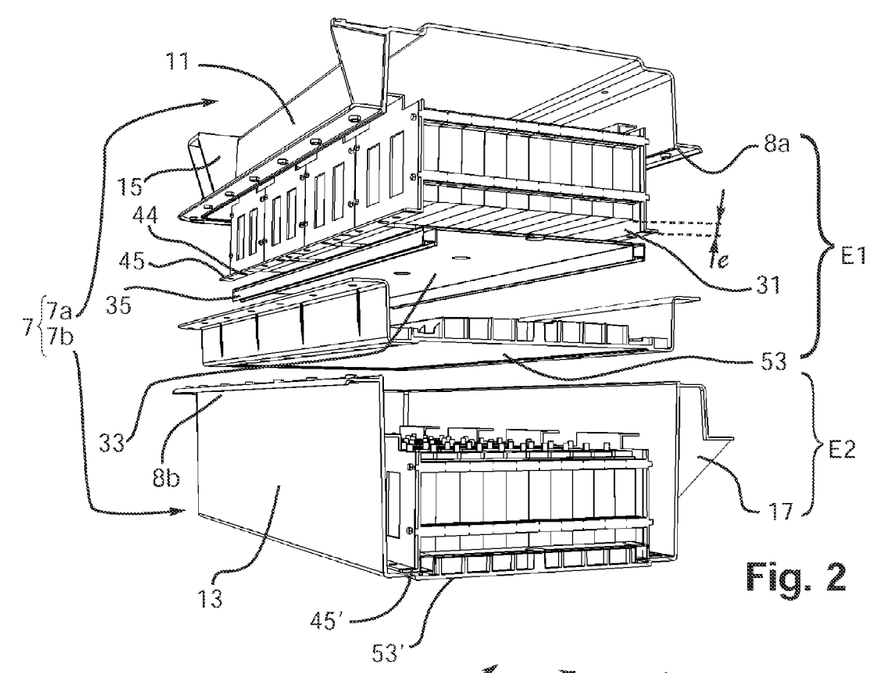
FIG. 2 is a transverse cross-section with partial exploded view of the battery pack shown on FIG. 1.
Figure 4:
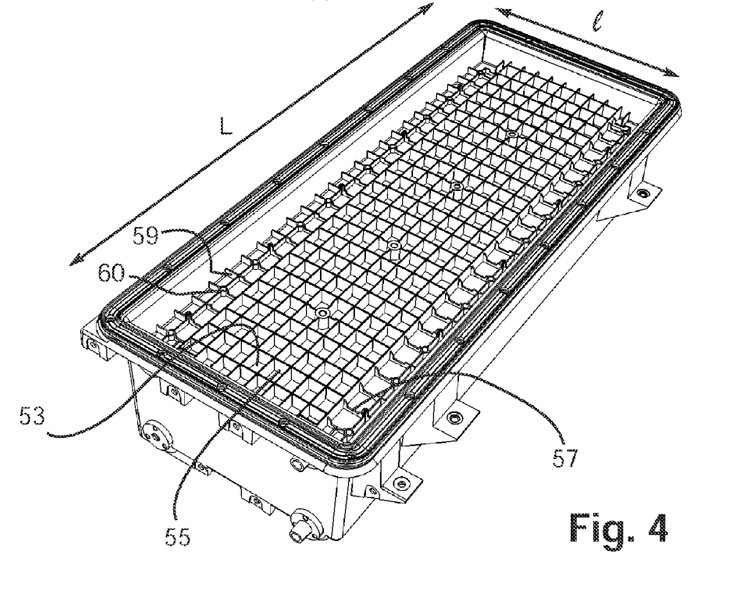
FIG. 4 is a view similar to FIG. 3, after removing one level of electrical modules.
Figure 6:
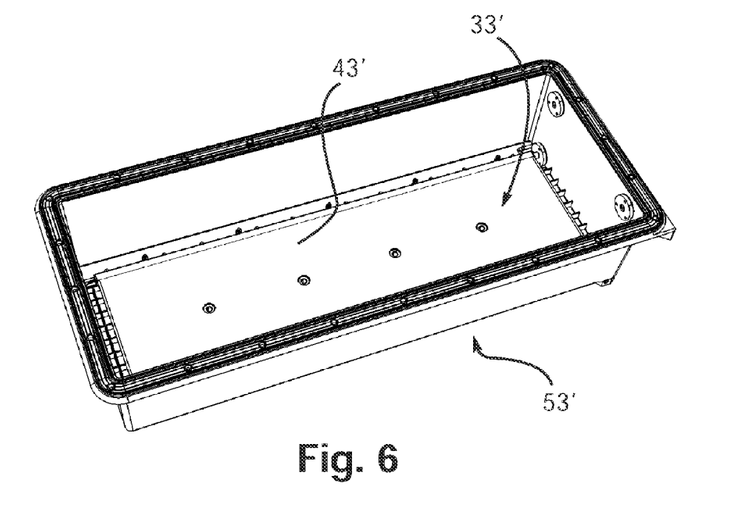
FIG. 6 is a perspective view from above of the open housing containing a heat-regulating plate.

The battery pack 1, more visible on the exploded view of FIG. 2, comprises a substantially parallelepipedic housing 7 made from mixed material formed by two upper 7a and lower 7b halves, each having a junction edge 8a, 8b. The edge 8b of the lower half 7b has a seal 9, shown on FIGS. 4 and 6.

The large sides 11, respectively 13, of the upper half 7a, respectively lower half 7b, comprise attachment lugs 15, respectively 17, for fastening the housing 7 to the floor 3.

The exploded view of FIG. 2 in particular shows that the elements present in the housing form two levels E1, E2 of assembled elements, the two levels being substantially identical and each comprising an inner space.

The invention is not limited to this embodiment and the housing could contain only one level, or on the contrary more than two levels.

Level E1 will now be described. Level E2 contains the same elements, referenced using the same numbers and the sign '.

Figure 3:
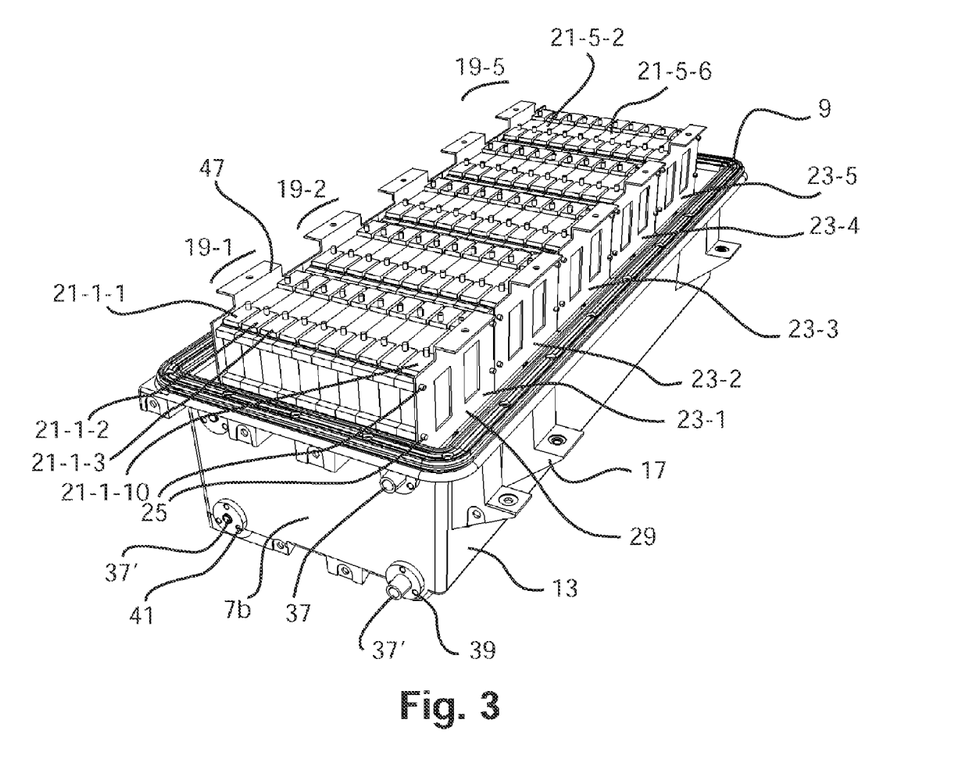
FIG. 3 is a perspective view of the battery pack whose housing has been opened.

As can be seen more clearly on FIG. 3, in this case a level contains 5 electrical modules 19-1, 19-2, 19-3, 19-4, 19-5 (designated generically by reference 19) placed beside each other. Each module is itself composed of ten prismatic cells with rectangular base 21-1-1, 21-1-2, 21-1-3, 21-1-4, 21-1-5, 21-1-6, 21-1-7, 21-1-8, 21-1-9, 21-1-10; 21-2-1 to 21-2-10; . . . ; 21-5-1 to 21-5-10 (designated generically by reference 21 in the remainder of this document) tightened against each other by their large sides and arranged with respect to each other such that their bottoms are coplanar and such that their small sides are also coplanar, so as to form a generally rectangular parallelepiped. Other cell shapes, or a different configuration of the set of cells forming a module, could of course be considered, possibly giving the module a different overall shape, provided that the bottom of the set of cells is flat or substantially flat.

In a module 19-1 (respectively 19-2, 19-3, 19-4, 19-5), the cells are held together by flanks 23-1 (respectively 23-2, 23-3, 23-4, 23-5, the flanks being designated generically by reference 23) placed against the two small end sides of the parallelepiped and connected together by four tie rods 25 (two on each large side of the parallelepipedic module). The five modules are held substantially in the same plane when they are placed side by side to form one level of the housing.

As can be seen on FIG. 7, the flanks 23 extend above and below the small end sides of the parallelepiped, leaving in particular, under the bottoms of the cells 21, a space 31, advantageously of height e between 10 and 20 mm, and more precisely 17 mm in this embodiment.

In the electrical modules 19 so assembled, the bottoms of their cells 21 lie substantially in the same lower plane, forming the ceiling of the space 31.

A heat-regulating plate 33, according to the rectangular embodiment example, is placed under all the bottoms of the cells 21 of the level. In this case, it is therefore shared by the five modules 19. In an alternative embodiment, each module 19-1 to 19-5 could have its own plate. The heat-regulating plate 33 is dimensioned to fit in the space 31. It is made from aluminum and, along its two large sides, has two main channels 35, extended by tubes 37 carrying heat transfer fluid, each tube opening into a hole in the housing 7 shown on FIG. 3. In level E2, the tubes 37' cross the holes 39, 41 of the lower half 7b of the housing 7. Each main channel 35 communicates with the other via secondary channels (not shown) distributed in the thickness of the plate. Other plate configurations are possible with, for example, main channels arranged in positions other than along the large sides of the plate.

Figure 7:
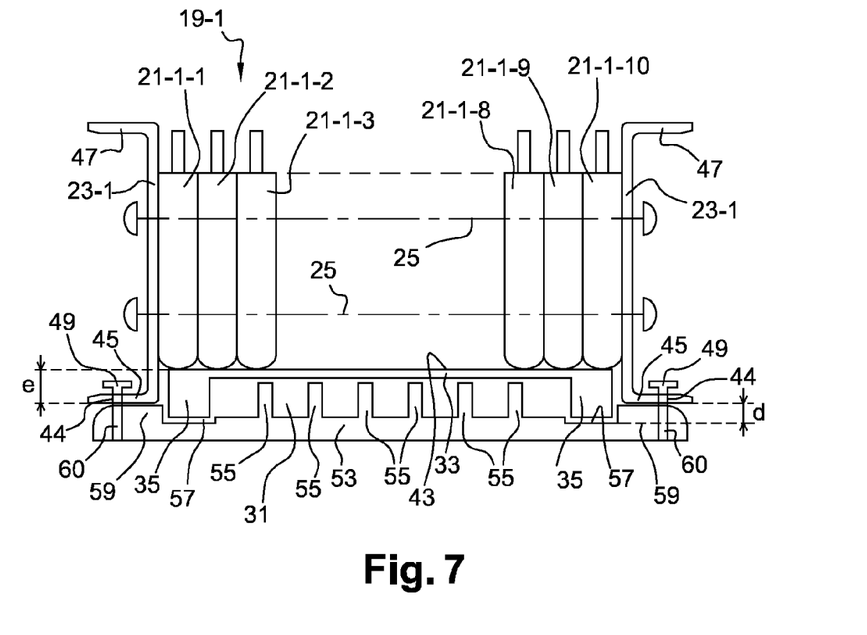
FIG. 7 is a diagrammatic view of assembled elements of one level of the battery pack.

As shown on FIG. 7, he main channels 35, contained in the space 31 with the heat-regulating plate 33, extend out of this space 31 by a height d.

On the heat-regulating plate 33, a heat-conducting film 43 (film 43 of level E2 is more clearly shown on FIG. 6), preferably made from ceramic-loaded silicone is provided to improve the heat conduction between the modules 19 and the plate 33. The thickness of this film 43 may vary, in particular from 0.5 to 1 mm and adapts to the reliefs caused by surface imperfections of the bottoms of the cells 21 and of the plate 33, thereby increasing the contact areas and therefore the heat conduction paths between these two parts.

Figure 5:
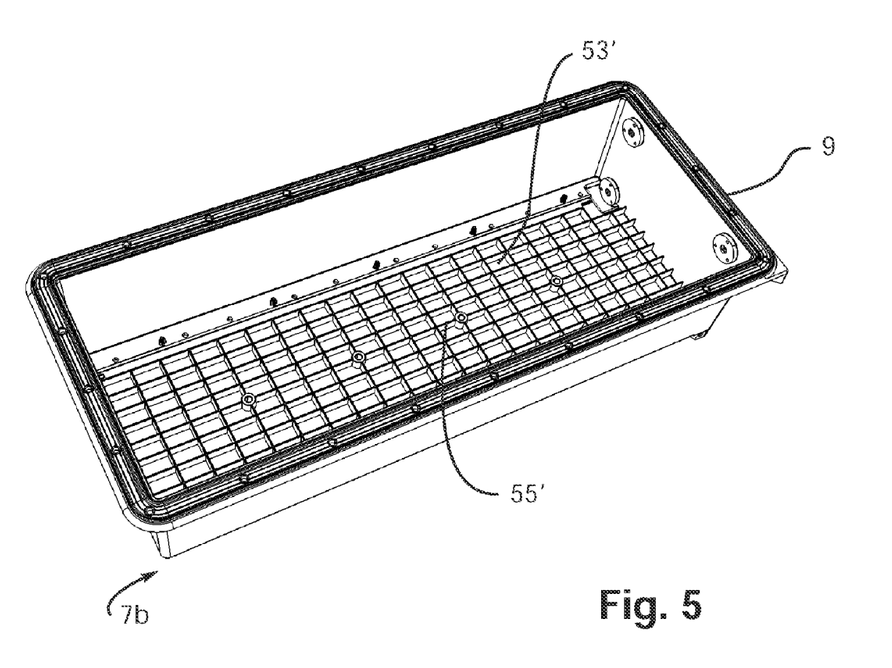
FIG. 5 is a perspective view from above of the open housing with its content completely removed.

The flanks 23 have lower edges 45, respectively upper edges 47, used to attach them, for example with screws 49, to a separation wall 53 which forms a bottom wall for the upper level E1. The wall 53 is more clearly shown on FIG. 4. On the lower level E2, the equivalent of the wall 53 is the bottom wall 53, which can be seen more clearly on FIG. 5.

Within the meaning of the invention, the walls 53 and 53' are intended to rest against the heat-regulating plate 33, 33' of a module. The housing comprises two inner spaces (not referenced), i.e. one for each level, each one being intended to contain a module 19 composed of a set of several electric cells 21.

In the remainder of the description, the inner side of a wall 53 or 53' will designate the side of this wall turned towards the inner space containing the module 19 interacting with the heat-regulating plate 33, 33' in contact with the wall.

The sectional diagram of FIG. 7 shows more clearly how the stack of the wall 53, the heat-regulating plate 33 (equipped with the film 43) and the cells 21 is created.

In particular, we see that the wall 53 comprises a network of crossed and perpendicular ribs 55 on its inner side, at the surface of he heat-regulating plate 33 contained between its main channels 35.

Although difficult to see on the figures due to the relatively small height variation between them, the ribs 55 are arranged in a network of crossed ribs lying within an envelope domed towards the inside of the housing and forming, within the meaning of the invention, an element in relief having a convexity towards the inside of the housing.

More precisely, L (FIG. 4) being the largest dimension of the wall, in this case its length since the wall is rectangular, and I being its second longest dimension, in this case its width, the envelope containing the ribs 55 is domed only in a plane normal to the wall and parallel to the direction of its width I. In other words, in transverse section parallel to the direction of the length L, the height of the ribs 55 is the same along the entire length L, but this height varies depending on the cross-section considered and is maximum on the central axis of symmetry X of the wall.

In the example of this embodiment, the maximum height of the convexity, that is, the height variation between the lowest point and the highest point of the network of ribs 55 is 1.5% of the width I (the smaller of the two largest dimensions L and I of the wall 53).

On each of its two longitudinal sides, the network of ribs 55 has a recess 57 of depth d dimensioned to contain the main channels 35 of the heat-regulating plate 33.

Along each recess 57, supports 59 parallel to the direction of the width act as seats for the lower edges 45 of the flanks 23. Some of these supports 59 include a tightening chimney 60 which is aligned with a hole 44 in the lower edges 45 of the flanks 23. Each edge 45 has two holes 44 and extends along a length corresponding to six supports 59 (numbered in the remainder of the document from first to sixth, in the direction of the length), covering entirely only the second to the fifth supports 59, while it covers only half of each of the first and sixth supports 59, each of these two supports receiving, on its other half, the flank next to the flank 23 considered.

The tightening chimneys 60 determine the tightening direction, which is therefore here, as will often be the case, perpendicular to the general plane of the wall 53.

As can be seen more clearly on the zoom of FIG. 7, tightening the screws 49 crossing the holes 44 in the lower edges 45 of the flanks 23 and the tightening chimneys 60 brings the modules 19 and the wall 53 closer together, thereby sandwiching the heat-regulating plate 33 between the wall 53 and the cells 21 as well crushing the film 43 between the heat-regulating plate 33 and the bottoms of the cells Due to the convex shape of the envelope of the ribs 55, deformation of the bottom wall 53 during tightening, potentially increasing on moving towards the axis of symmetry X of this wall 53, is compensated by the increased height of the ribs on approaching this axis.

In a given level, therefore, the following elements are stacked:
cells 21, 21' grouped in modules 19, 19',
a heat-regulating plate 33, 33',
a wall 53, 53' tightened against the modules by tightening means.

Figures 8, 9:
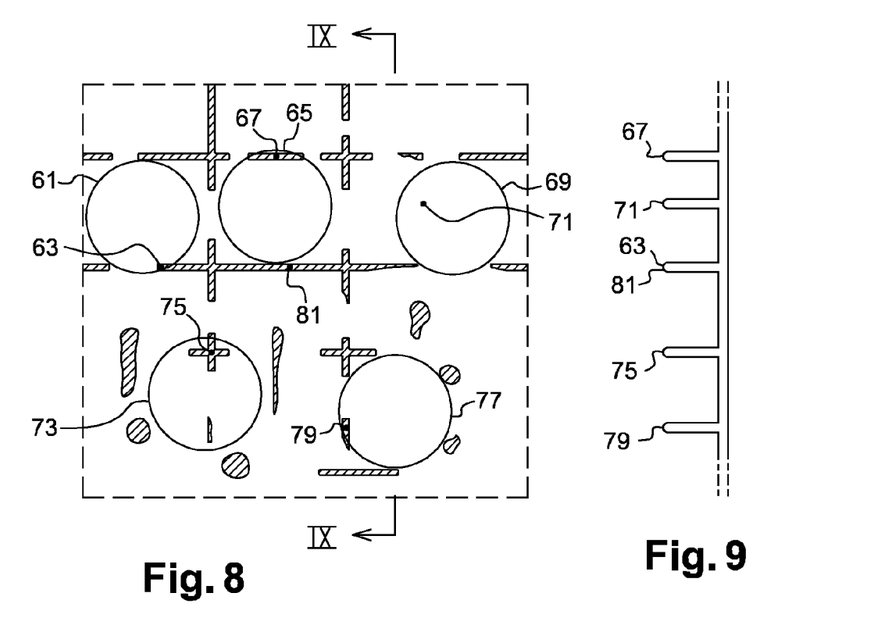
FIG. 8 is a diagrammatic view from underneath and at a larger scale of part of the heat-regulating plate and its areas in contact with the bottom wall of the housing.
FIG. 9 is a diagrammatic sectional view along IX-IX of a part of the bottom wall corresponding to the part of the heat-regulating plate shown on FIG. 8.

FIG. 8 shows the areas of the heat-regulating plate 33 on which the pressure of the ribs 55 is exerted after tightening.

These areas are designated as "contact areas".

This pressure results from contact with the highest areas of the bottom wall 53.

In practice, the contact areas can be indicated by depositing a colored powder on the free upper edges of the ribs 55. When the heat-regulating plate 33 is tightened by the bottom wall 53, this power is transferred onto the plate 33 to produce the pattern shown on FIG. 8.

As can be seen on FIG. 8, if we consider any disc of diameter D on the heat-regulating plate 33, there is always at least one contact area. This contact area corresponds, on the bottom wall 53, to the highest point Hi of the free upper edges of the ribs 55.

Therefore, disc 61 contains the highest point 63, disc 65 contains the highest point 67, disc 69 contains the highest point 71, disc 73 contains the highest point 75, and disc 77 contains the highest point 79.

In addition, the bottom wall 53 has the highest point 81.

Each of these highest points 63, 67, 71, 75, 79 and 81 is at the top of a rib 55 in the network of ribs, as shown on the cross-section of FIG. 9.

This figure also shows that the cross-section of the tops of the ribs 55 may be rounded, which reduces the area of each contact area. However, since the material of the ribs can deform (elastically or plastically), the top of each rib can crush such that the contact areas are not simple lines.

The heat-regulating plate 33 is therefore kept in optimum contact with the cells 21 over its entire surface, it being understood that "optimum" refers to the fact that the contact between these two parts occurs at least in areas sufficiently close together so that two adjacent points are not separated by more than the distance D or, in other words, so that any circle of diameter D drawn on the heat-regulating plate 33 contains at least two of these contact areas, resulting in a relatively high and regular density of contact points between the plate and the cells.

Figure 10:
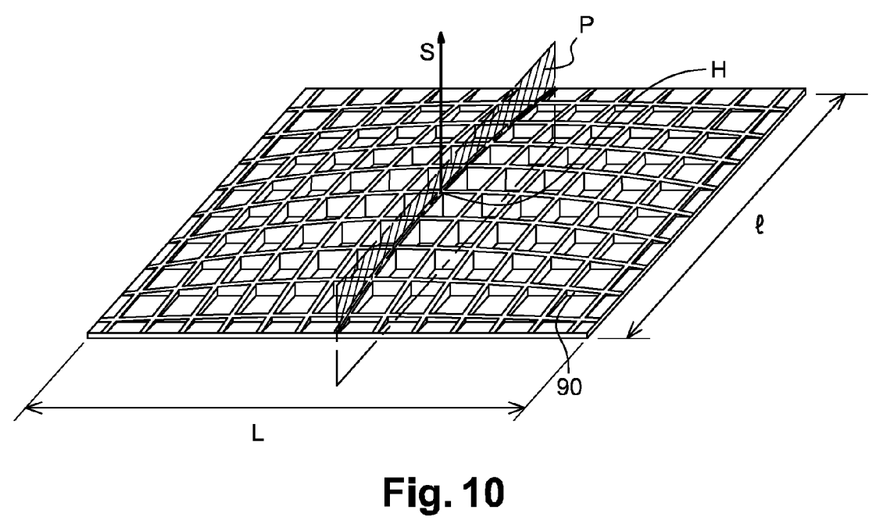
FIG. 10 is a perspective view of an alternative embodiment of the bottom wall, whose element in relief comprises a network of ribs.

In the embodiment of FIG. 10, the wall 53 has two large dimensions L and I. It comprises an element in relief composed of a network of crossed perpendicular ribs 90 of square mesh.

This network of ribs 90 is convex, in the sense that the tops of the ribs 90 lie within a envelope domed upwards (with respect to the figure).

The convexity of the envelope extends in the two directions of L and I, with a maximum height, i.e. a height variation between the lowest point and the highest point, advantageously of 2% of I, although, on the schematic diagram of FIG. 10, the curvature has been accentuated to clearly illustrate the meaning of the convexity.

The convexity of the network of ribs can be checked by proceeding as follows.

1) Define a diameter D according to the dimensions of the heat-regulating plate, which in this case is assumed to have the same width I and the same length L as the wall. In this case, we take D=50 mm.

2) Detect the highest point H of the wall, along the tightening direction indicated by the arrow S pointing upwards, 3) Draw a grid with square mesh of side $D/\sqrt{2}$, having an intersection at point H. At each intersection of the grid, draw a circle of diameter D.

4) In each disc of diameter D, find the highest point $H_i$.

5) Take a plane P passing through the point H and parallel to the direction S and to the direction of the length L.

6) Project orthogonally on the plane P the highest points $H_i$ obtained in step 3 which are located at a distance from the plane P of less than the diameter D, to obtain points $h_i$.

7) Check that, on the plane P, the broken line passing through all the points $h_i$ and through point H is convex.

8) Rotate the plane P around the direction S and repeat steps 5 and 6.

An alternative method consists in determining whether a direction of "non-convexity" exists, along which all the points obtained in step 3 present in a plane parallel to this direction have the same height. If it exists, execute steps 5 to 6, choosing a plane P parallel to S and perpendicular to the direction of "non-convexity", sweeping the entire wall at the plane P by translational motion over a distance D.

Figure 11:
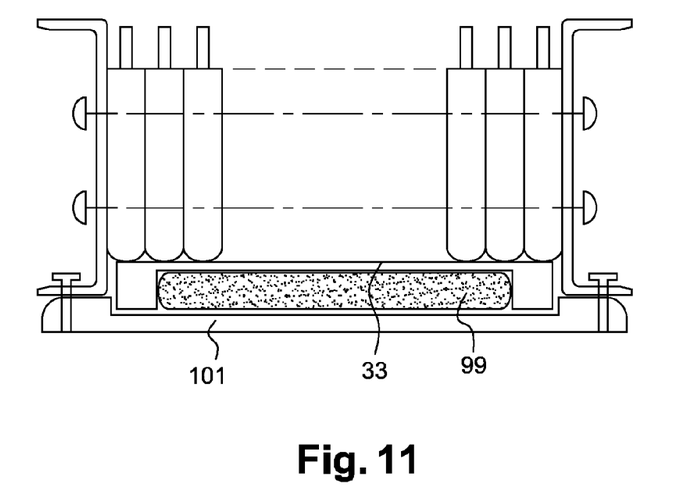
FIG. 11 is a general sectional view of a battery pack comprising a pouch of gel as element in relief.

In the embodiment of FIG. 11, the ribs described previously are replaced by a pouch of gel 99. The bottom wall 101 of the housing is flat and has no ribs. The pouch of gel 99 forms an element in relief of the bottom wall 101, which transmits the pressure exerted by the bottom wall 101 to the heat-regulating plate, homogeneously and at every point of its surface.

Once again, the pressure transmitted is the same at every point of the heat-regulating plate 33, irrespective of the deformation suffered by the bottom wall 101 when tightening the screws 49 fastening the flanks 23 to the bottom wall 101.

Obviously, the examples described above are given as illustrations only and cannot be construed as limiting the scope of the claims.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A housing of a battery pack for a motor vehicle comprising an inner space designed to contain at least one module, comprising a set of several electric cells, associated with a heat-regulating plate, the housing having at least one wall designed to rest against the heat-regulating plate when the at least one module is present in the housing, the housing comprising tightening means for tightening a module against said at least one wall and in that said at least one wall comprises, on its inner side facing towards the heat-regulating plate, an element in relief contained within a volume having a convexity turned towards the inner space of the housing.

2. The housing according to claim 1, whose said at least one wall is made from a thermoplastic material or a thermosetting plastic material or a mixture of the two previous materials or molded aluminum or cast aluminum.

3. The housing according to claim 1, wherein the tightening means is capable of closing the housing, comprising a bottom and a lid, said bottom or said lid comprising said at least one wall intended to rest against the heat-regulating plate.

4. The housing according to claim 1, wherein the tightening means consist of means for attaching the module directly to said at least one wall using flanks tightened to two opposite sides of the module.

5. The housing according to claim 1, wherein the tightening means define a tightening direction (S) and the convexity of the element in relief is defined by the following characteristics, the heights being measured in the tightening direction:
existence of at least one highest point H (81) of the element in relief,
existence of at least one plane P of projection passing through the highest point H (81) and parallel to the tightening direction (S), at least one plane being such that in any area obtained by projection on the element in relief of a disc of predetermined diameter located in a second plane P' perpendicular to the tightening direction and passing through the highest point of the element in relief, there is at least one highest point $H_i$, whose orthogonal projection $h_i$ on the plane of projection has a height on the plane of projection which decreases with the distance between said projection and the highest point H.

6. The housing according to claim 1, wherein the element in relief comprises a solid having a convexity turned towards the inside of the housing.

7. The housing according to claim 6, wherein the solid comprises a network of ribs projecting from the inner side of the at least one wall and lying within an envelope domed towards the inside of the housing.

8. The housing according to claim 7, wherein the ribs of the network of ribs are integrally molded with the at least one wall.

9. The housing according to claim 6, wherein the solid is obtained by giving the at least one wall a convex shape towards the inside of the housing.

10. The housing according to claim 6, wherein the solid comprises a set of studs formed on the bottom wall and each contact area is the top of a stud.

11. The housing according to claim 1, wherein the element in relief comprises a block of deformable material having an outer side of convex shape towards the inside of the housing.

12. The housing according to claim 1, wherein the wall has a first large dimension (L) along a first direction, a second large dimension (I) along a second direction perpendicular to the first, and wherein the maximum height of the convexity, which is the height variation between the highest point and the lowest point of the element in relief, is between 0.1% and 2% of one of these two large dimensions of the wall.

13. The housing according to claim 12, wherein said one of these two large dimensions of the wall is the smaller dimension of these two large dimensions.

14. A battery pack for a motor vehicle, comprising a housing comprising an inner space designed to contain at least one module, comprising a set of several electric cells, associated with a heat-regulating plate, the housing having at least one wall designed to rest against the heat-regulating plate when the module is present in the housing, this housing comprises tightening means for tightening a module against said wall and said wall comprises, on its inner side facing towards the heat-regulating plate, an element in relief contained within a volume having a convexity turned towards the inner space of the housing, the element in relief is arranged and dimensioned to transmit to the heat-regulating plate a tightening pressure exerted by the at least one wall, this tightening pressure being such that the element in relief and the heat-regulating plate remain in contact with each other, notwithstanding a possible deformation of the at least one wall caused by the tightening, this contact occurring at least at points of the element in relief, distributed such that any disc of 20 to 80 mm diameter drawn by projection on the heat-regulating plate contains at least two of these points.

15. The battery pack according to claim 14, wherein each cell comprises a rigid envelope and the envelopes of the cells in a given module form a rigid block by being pressed against each other along a transverse direction with their bottoms coplanar.

16. The battery pack according to claim 15, wherein the rigid envelopes of the cells have a prismatic shape, with rectangular bases.

17. The battery pack according to claim 14, wherein several modules share the same heat-regulating plate.

18. The battery pack according to claim 14, wherein the element in relief comprises a pouch of an incompressible liquid or gel, capable of transmitting uniformly and isotropically the pressure placed on it and which results from the force tightening the at least one wall against the plate.

19. The battery pack according to claim 18, wherein the liquid or gel exhibits heat insulation properties.

20. The battery pack according to claim 18, wherein the liquid or gel exhibits electrical insulation properties.

21. A battery pack for a motor vehicle, wherein it comprises a housing comprising an inner space designed to contain at least one module, comprising a set of several electric cells, each of said at least one module is associated with its own heat-regulating plate, the housing having at least one wall designed to rest against the at least one heat-regulating plate when the at least one module is present in the housing, this housing comprises tightening means for tightening a module against said wall and said wall comprises, on its inner side facing towards the at least one heat-regulating plate, an element in relief contained within a volume having a convexity turned towards the inner space of the housing, the element in relief is arranged and dimensioned to transmit to the at least one heat-regulating plate a tightening pressure exerted by the wall, this tightening pressure being such that the element in relief and the at least one heat-regulating plate remain in contact with each other, notwithstanding a possible deformation of the wall caused by the tightening, this contact occurring at least at points of the element in relief, distributed such that any disc of 20 to 80 mm diameter drawn by projection on the at least one heat-regulating plate contains at least two of these points.

* * * * *

UNITED STATES PATENT AND TRADEMARK OFFICE
CERTIFICATE OF CORRECTION

PATENT NO. : 9,818,994 B2
APPLICATION NO. : 14/375901
DATED : November 14, 2017
INVENTOR(S) : Gerald Andre et al.

It is certified that error appears in the above-identified patent and that said Letters Patent is hereby corrected as shown below:

On the Title Page

Item (71) Applicants, delete "Lyons" and insert --Lyon-- therefor.
Item (73) Assignees, delete "Lyons" and insert --Lyon-- therefor.

In the Specification

Column 4, Line 1, delete "wail" and insert --wall-- therefor.
Column 5, Line 20, delete "Ina" and insert --In a-- therefor.
Column 7, Line 65, delete "he" and insert --the-- therefor.
Column 8, Line 2, delete "43" and insert --43'-- therefor.
Column 8, Line 15, delete "bottom wall 53" and insert --bottom wall 53'-- therefor.
Column 8, Line 31, delete "he" and insert --the-- therefor.
Column 9, Line 14, insert --21-- after "cells".

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*